United States Patent [19]

Franz

[11] Patent Number: 4,539,252
[45] Date of Patent: Sep. 3, 1985

[54] VARIABLE DENSITY BOARD HAVING IMPROVED THERMAL AND ACOUSTICAL PROPERTIES AND METHOD AND APPARATUS FOR PRODUCING SAME

[75] Inventor: Edward W. Franz, Colts Neck, N.J.

[73] Assignee: Celotex Corporation, Tampa, Fla.

[21] Appl. No.: 492,714

[22] Filed: May 9, 1983

Related U.S. Application Data

[62] Division of Ser. No. 167,800, Jul. 14, 1980.

[51] Int. Cl.[3] .................. C04B 43/02; E04B 1/76; E04B 1/82; E04B 1/88
[52] U.S. Cl. ..................... 428/218; 181/198; 181/200; 181/204; 181/294; 428/284; 428/285; 428/288; 428/290; 428/310.5; 428/920
[58] Field of Search ............ 181/200, 204, 294, 198; 428/218, 284, 285, 288, 290, 310.5, 920

[56] References Cited

U.S. PATENT DOCUMENTS

| | | | |
|---|---|---|---|
| 3,652,377 | 3/1972 | Helmick | 428/218 |
| 3,936,555 | 2/1976 | Smith | 428/218 |
| 3,952,124 | 4/1976 | Mesek | 428/218 |
| 4,175,148 | 11/1979 | Luck et al. | 428/218 |
| 4,195,110 | 3/1980 | Dierks et al. | 428/218 |
| 4,283,450 | 8/1981 | Luck et al. | 428/218 |
| 4,310,585 | 1/1982 | Shannon | 428/218 |

*Primary Examiner*—James C. Cannon
*Attorney, Agent, or Firm*—Louis Weinstein

[57] ABSTRACT

A board having improved thermal and/or acoustical properties is disclosed, together with a method and apparatus for producing same. The board is of finite thickness and has a graduated density, the two opposing major surfaces have the greatest density and the intermediate portion has the least density with the board density gradually decreasing in the region between the major surfaces toward the intermediate portion thereof. The board is produced by a molding process, wherein blankets of loosely gathered fibers and containing a suitable binder, are utilized to form the board. The blankets are preferably high compressible and have interposed therebetween an initially relatively highly incompressible air filled member. These laminates are pressed together between a pair of heated mold halves. As the temperature of the laminate increases, the interposed member softens and is rapidly reduced in thickness due to the escape of air as it softens and melts. The resilient blankets which have previously undergone compression expand into the void created by the contracting interposed member at a time prior to the setting of the inner portions of said resilient blankets, wherein the resulting product provides improved thermal and/or acoustic properties by virtue of the density profile of the finished product which has maximum density at the major surfaces thereof and which gradually decreases in density toward the intermediate portion thereof. The interposed member in one preferred embodiment, is comprised of pockets of air encapsulated in a plastic material which softens and melts at a temperature well below that at which the binder in said blankets is cured. The interposed media may be a filler of a low density, preferably thermoplastic material which is significantly less yieldable than said blankets and which is adapted to contract significantly as it softens and melts.

7 Claims, 16 Drawing Figures

VARIABLE DENSITY BOARD HAVING IMPROVED THERMAL AND ACOUSTICAL PROPERTIES AND METHOD AND APPARATUS FOR PRODUCING SAME

This is a division of application Ser. No. 167,800, filed July 14, 1980.

FIELD OF THE INVENTION

The present invention relates to a board or panel having improved thermal and/or acoustical properties and method and apparatus for producing same, and more particularly to a board having a density which varies across the thickness thereof and wherein the method and apparatus for producing same utilizes loosely gathered fibrous sheets in combination with interposed sheet means which is initially relatively incompressible relative to said fibrous sheets and which collapses in a unique way in order to obtain the aforesaid variable density structure.

BACKGROUND OF THE INVENTION

A number of applications exist wherein it is desirable to provide panels or boards having desirable acoustical and/or thermal properties. For example, it is desirable to provide molded panels for use as liners in heavy machinery for purposes of sound and/or thermal attenuation, such applications including molded liners for the interior of truck cabs and the like, liners for engine compartments and fire walls, and so forth. It many applications, it has been found that panels formed of fiberglass have yielded desirable results although other textile fabrics and fibers may be employed such as resinated cotton, synthetic fibers, reclaimed fibers and the like.

In applications wherein it is desirable to provide a predetermined level of sound attenuation, the desired attenuation may be obtained through the use of boards produced from fiberglass or other suitable fibrous media. The sound attenuation capability of such a fiberglass board is a function of the density and thickness of the board. One technique for producing boards having desirable thermal and/or acoustic properties is to mold the boards from basic blankets which are comprised of loosely gathered fiberglass filaments and a suitable binder. The fibers are preferably saturated with a resin or a binder such as a phenolic or thermoplastic or other thermosetting binders which are utilized, when cured, to hold the fibers together in order to assure the proper molded shape of the molded end product.

In order to obtain the desired density, it is conventional to utilize the aforementioned blankets of reasonably standardized density and to place the desired number of blankets within a mold in order to form a panel or board having the desired acoustic and thermal properties. For example, blankets of the type described may have a nominal uncompressed density of one pound per cubic foot and a nominal uncompressed thickness of one inch. Assuming it is desired to produce a board having a thickness of 0.5" and a density of 8 lbs. per cubic foot, the desired board may be produced of four (4) of the aforementioned blankets which are inserted within a mold designed to compress the blankets to a total thickness of 0.50". Insertion of four such blankets into the mold produces an end product having a density of 8 lbs. per cubic foot. The mold is normally heated and is maintained at a temperature level sufficient to cause the binder to set, thereby obtaining a board having the desired thickness and density. The blankets are retained in the mold for a period of time sufficient to set the binder and thereby provide a finished product having a substantially uniform density and thickness in order to achieve the desired acoustical and/or thermal attenuation properties.

A number of applications exist wherein it is desired to provide acoustical panels and the like with predetermined shapes and with portions thereof having thicknesses which significantly deviate from the nominal thickness. For example, in applications wherein the molded members are designed for use as liners in the cabs of large industrial vehicles, the liners are typically designed to conform to the interior shape of the cab, such as, for example, the cab ceiling, and interior walls, hence the necessity for shaped molded members. In order to facilitate mounting of the liners to the interior surface of the cab, it is frequently desirable to provide openings for receiving fastening members and to provide the marginal portions of said openings with a thickness which is significantly reduced from the nominal thickness of the liners. In the example where a molded sheet formed of four standard blankets having densities of 1 lb. per cubic foot and uncompressed thicknesses of 1", the portions of reduced thickness of the molded end product may be as small at $\frac{1}{8}$" making the density in such regions as high as 32 lbs. per cubic foot. The density and/or packing of the fibers in the regions of significantly reduced thickness is so great as to prevent the molds from compressing the original blankets down to the desired thickness, thereby requiring use of fewer blankets or blankets having lower nominal densities in order to allow the portions of the molded member of significantly reduced thickness to be molded to the desired thickness. This results in a reduced density for the major portion of the liner, which yields an undesirable compromise between the thickness and acoustical and/or thermal properties of the molded end product.

It is also required in some applications to provide certain surface finishes for the liner necessitating that the liner have a smooth high density finish capable of receiving and retaining the surface finish to be applied thereto. These requirements further increase the density requirements of the end product, which contributes to undesirable increases in material costs, process costs, labor costs, weight and brittleness.

The problems of panel brittleness result from the fact that the end product requires an increased density sufficient to provide a surface capable of being finished in the predetermined manner with the result that the end product is overly brittle and thus highly susceptible to breakage.

Surface coatings or facings require a good high density surface to promote application and retention, thus requiring higher density panels which necessitate the use of a greater amount of fibrous material.

The criteria to be considered in forming molded parts of the type described above are, in the order of importance, the selection of the materials for achieving the desired thermal and/or acoustic properties; the structural requirements; and the shape and thickness of the molded part. The desired acoustic and/or thermal attenuation is a function of the thickness and density of the molded part. The ideal thickness of the sound absorbent material is one half the wave length of the sound to be absorbed. Assuming the sound to be absorbed has a frequency of 250 cycles per second, one half the wave-length of this frequency is 2.25 ft. which is clearly an impractical design from the viewpoint of both cost and size. Thus, conventional present-day designs are the result of a compromise which is struck between a group of the primary factors which contribute to the design of acoustic and/or thermal panels and the like.

Structural requirements frequently necessitates changes in density to provide adequate supporting or mounting strength for portions of the panel.

The shape and thickness of the molded part impose limitations on maximum permissible density, necessitating reduction in overall density in order to be assured of achieving the desired molded shapes, the practical limitations of the raw material being such that the fibers of the blanket do not "flow" in the same manner as plastic material flows in order to freely and easily assume desired shapes and configurations.

The interplay of the three above-mentioned criteria result in a molded end product having an overall design in which density and thickness are compromised to achieve a satisfactory balance of the desirable operating and design characteristics.

It therefore becomes desirable to provide a novel method and apparatus for producing molded members and novel molded members having desirable acoustical and/or thermal properties and which more favorably conform to the important design criteria for such panels and which have improved characteristics as compared with panels produced through the use of conventional methods.

BRIEF DESCRIPTION OF THE INVENTION

The present invention is characterized by comprising a novel end product and method and apparatus for producing same, wherein said end product is capable of providing equivalent and in most cases superior acoustical and/or thermal properties as compared with conventional products of the same category and which is capable of being produced at significantly reduced cost.

The molded member of the present invention is characterized by being comprised of natural or synthetic fibers set in a binder and having a density which is maximum along the major exterior surfaces of the molded member and which gradually reduces in density toward the intermediate region thereof. The molded member is preferably produced from a plurality of blankets, each comprised of loosely-gathered substantially uncompressed fibers which are saturated or otherwise treated with a phenolic resin or other suitable binder. The said blankets are placed in a mold and a void producing media which is initially relatively incompressible as compared to the highly compressible blankets, is positioned intermediate the aforementioned blankets. Said media, in one preferred form, is comprised of plastic sheets which cooperatively encapsulate pockets of air. The heated mold is closed on the aforementioned members inserted therein, compressing the laminate to the desired end thickness. The fibrous blankets undergo a relatively large amount of compression, while the interposed media experiences minimal compression relative to that experienced by the aforementioned blankets.

The heated mold establishes a temperature gradient across the thickness of the blankets and the interposed media, whereupon said media softens, and ultimately melts, allowing the encapsulated air to escape. The media thus beings to rapidly contract from its initial maximum thickness to a thickness no greater than that of the sheets of plastic film from which the media is originally formed. The blankets in the immediate regions on the opposite sides of the media are still highly resilient since they have yet to be cured and are free to expand into the "void" created due to the contraction of the interposed media as the plastic film undergoes softening and melting. The encapsulated air passes through the interstices of the blankets which are porous to provide more than adequate escape paths for the air to pass through the blankets and out of the mold. The mold is preferably provided with means in the form of perforations to permit release of the air escaping from the media during the molding operation.

The molded member is raised to a temperature sufficient to melt the plastic film comprising the void producing media, so that the porosity of the molded product is assured. In order to further facilitate the characteristic of high, uniform porosity, air is blown through the product during the molding and heating process to prevent the plastic film from forming a non-porous barrier along the center portion of the molded member.

The time interval during which heat is applied to the molded member and the temperature profile is chosen to assure that the molded product will have a high density in the immediate region of the major faces of the molded product since these faces are cured by the high temperature, while the reduced temperature level in the intermediate region of the molded product is insufficient to cure the binder in this region at the same rate as the major surfaces, allowing the still resilient portions of the blankets to expand and fill in the "void" created by the contraction of the interposed media, the portions of the original blankets making up the intermediate portion of the molded member being free to expand into the "void" created by the contracting media due to the fact that said portions have not yet been cured due to the predetermined temperature profile created across the molded member.

The resulting molded product thus has a high density at its major surfaces and gradually reduces in density from each of its opposing major surfaces toward the center thereof, the intermediate portion being the portion of lower density.

The resulting product provides an "effective" overall density which is superior in its acoustic attenuation properties as compared with the density of molded members produced in the conventional manner and having a substantially uniform density across the thickness thereof.

The reduced density of the intermediate portion of the molded product provides a significant improvement in the pliability and resilience of the molded product, making it significantly less susceptible to cracking or breakage due to bending during storage, handling or use. The increased density in the regions of the major surfaces provide a surface finish which is extremely advantageous for application of finishing materials and the like which are easier to apply and which assure good adherence of the finishing treatment to the surface of the molded product.

Although the interposed media may be said to be substantially incompressible when exposed to moderate compressive forces, as compared with the blankets of loosely gathered fibers, the media is nevertheless yieldable under larger compression forces applied by the mold members so as to be reduced to a minute thickness in regions where the thickness of the molded product is significantly reduced, as compared with the nominal thickness of the molded product, in order to permit the mold members to fully close and thereby providing an interposed media which in fact is yieldable in certain critical regions under large compression forces exerted upon the interposed media by the mold members.

The interposed media thus serves as a filler for the intermediate portion of the product to be molded, which filler is adapted to be significantly and rapidly reduced in volume during the heating and curing step to reduce the density of the molded end product in the region intermediate the major surfaces of the molded end product due to the expansion of the initially compressed blankets of fibrous material into the void created by the interposed media.

The criteria for an interposed media capable of providing the above functions is that it be initially substantially incompressible relative to the highly compressible blankets of fibrous material when the interposed media and blankets are initially compressed within a mold and that it be adapted to soften and melt at a temperature well below the curing temperature of the binder material provided in the fibrous blankets, whereby the volume which it occupies when initially placed in the mold is significantly reduced due to heating, enabling the compressed fibrous material which has not yet been cured and set to expand into the void being created by the filler material, resulting in a significant reduction in density in the intermediate region of the molded end product when the molding operation is completed.

Although the plastic film formed to provide encapsulated air chambers adequately meets all of the above criteria for the interposed media, it should be understood that other materials may be used as the filler. For example, the filler may be comprised of expanded polystyrene which has previously been expanded, prior to the aforesaid molding operation, in the form either of individual beads or a panel of either uniform or non-uniform thickness, depending upon the requirements of the particular molded end product to be produced. The filler is placed in a mold between the highly compressible fibrous blankets so that the filler material undergoes only slight compression while the fibrous blankets undergo a large amount of compression.

During heating, the temperature level is sufficient to soften and eventually melt the filler material which disperses into the interstices of the fibrous blankets. The portions of the fibrous blankets adjacent to the filler material have not yet been set and expand into the void being created by the filler material, significantly reducing the density of the molded end product in the intermediate portion thereof.

It should be understood, however, that any other thermoplastic material exhibiting the above characteristics may be employed with equal success.

The molding time and molding materials necessary to produce end products in accordance with the novel techniques of the present invention are significantly reduced, yielding an important reduction in end product cost, thus yielding a finished molded product whose characteristics are equivalent and in most cases superior to molded products produced with conventional techniques, which advantageous characteristics are achieved at lower costs as compared with conventional techniques.

As was mentioned hereinabove, it is important to assure that the molded end product is porous. This characteristic is facilitated by the use of perforated mold members. Heated air under pressure is blown through such perforated mold members and the product being molded to assure that the melting plastic film comprising the interposed media is sufficiently dispersed to assure that the molded end product has the requisite porosity.

OBJECTS OF THE INVENTION AND BRIEF DESCRIPTION OF THE FIGURES

It is, therefore, one object of the present invention to provide a novel molded end product having improved acoustical and/or thermal characteristics and a novel method and apparatus for producing same.

Still another object of the present invention is to provide a novel molded product having improved acoustical and/or thermal characteristics in which the molded end product is comprised of a unitary member having high density at the major surfaces thereof, said density gradually decreasing from both major surfaces toward the intermediate portion of the molded member.

Still another object of the present invention is to provide a novel method for producing molded products having improved thermal and/or acoustical characteristics, comprised of interposing a media between blankets of loosely gathered fibers; compressing said blankets containing said interposed media to the desired thickness of the end product and applying heat to cause the interposed media to contract, enabling the fibers in those portions of the resilient blankets which have not yet been set to expand into the void created by the contracting media, thereby producing an end product whose density varies across the thickness thereof.

Still another object of the present invention is to provide a novel media for use in producing molded end products having improved thermal and/or acoustical properties wherein said media is comprised of a plastic film forming chambers of encapsulated air, which plastic film is adapted to melt at temperatures below the temperatures necessary to cure the binder in said blankets and set the fibers of the molded product to create a porous molded end product whose density varies across the thickness thereof.

Still another object of the present invention is to provide a novel method for producing a unitary panel of varying density through the use of fibrous blankets and a filler interposed therebetween, which filler is formed of a material substantially less compressible than said blankets and adapted to soften and melt during the heating and curing phase of the unitary panel to create a void which is filled by expansion of the fibrous blankets into the aforesaid void.

The above, as well as other objects of the present invention, will become apparent when reading the accompanying description and drawing in which:

FIGS. 1(a) through 1(c) show elevational developmental views of the conventional process for producing molded products having desirable acoustical and/or thermal characteristics.

FIGS. 2(a) through 2(f) show elevational developmental views of the method and apparatus which embody the principles of the present invention for the purpose of producing molded end products having significantly improved thermal and/or acoustical properties.

Figure 3:
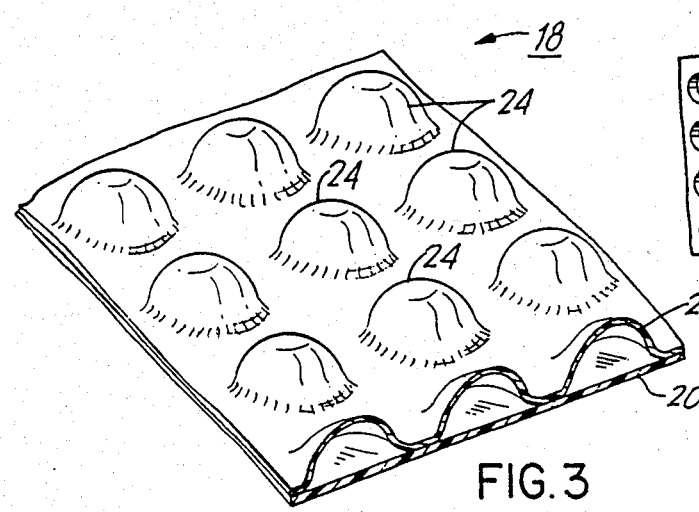
FIG. 3 is a perspective view showing one type of interposed media which may be employed in the process steps depicted in the developmental views of FIGS. 2(a) through 2(f).
Figure 5:
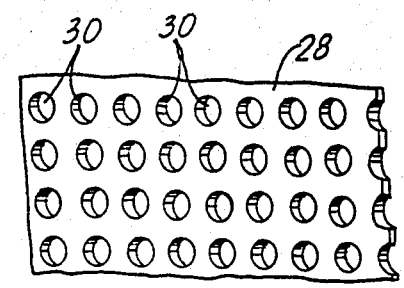
FIG. 5 is a perspective view of a portion of one of the mold members of FIG. 2(f).
Figure 6A:
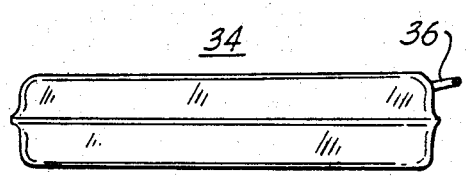
Figure 6B:
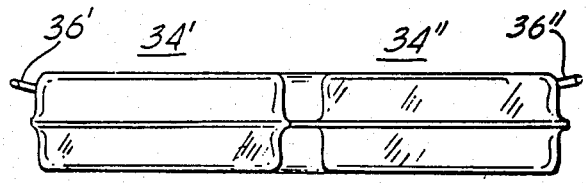

FIGS. 6(a) and 6(b) show alternative embodiments which may be substituted for the interposed media of FIG. 3.

Figure 7:
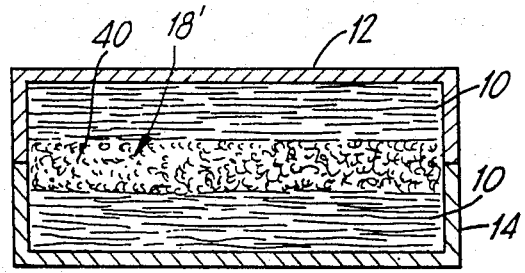
Figure 8:
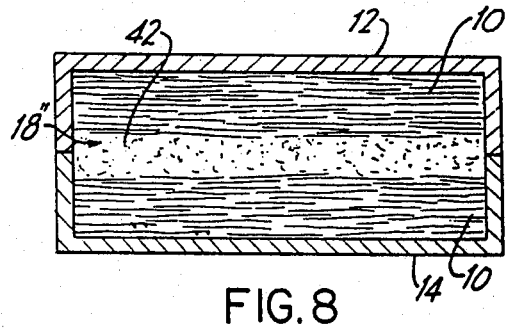

FIGS. 7 and 8 are elevational views showing additional alternative embodiments of the present invention for molding panels having the desired characteristics described hereinabove.

DETAILED DESCRIPTION OF THE INVENTION AND THE PREFERRED EMBODIMENTS

Before undertaking a detailed description of the present invention, it is felt to be beneficial to understand the conventional method employed for producing molded end products having desirable thermal and/or acoustical properties. An understanding of the conventional technique can best be understood from a consideration of FIGS. 1(a) through 1(c).

Figure 1A:
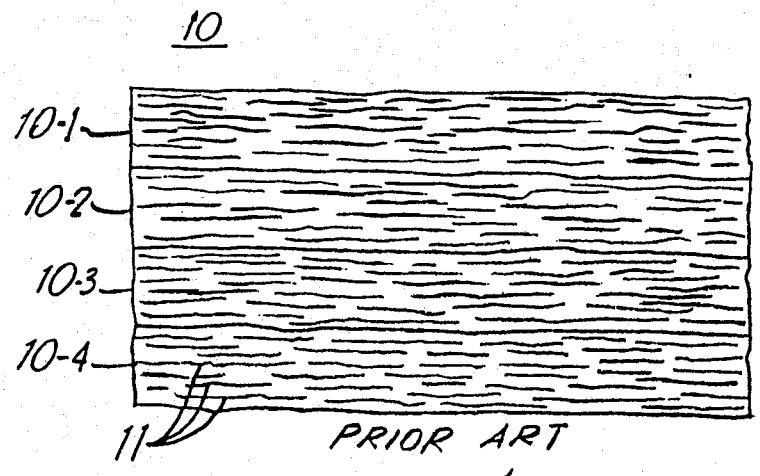

As was mentioned hereinabove, blankets of loosely gathered fibers are utilized to produce the molded panels. FIG. 1(a) shows an arrangement 10 of four such blankets designated by numerals 10-1 through 10-4 and stacked one upon the other. Each blanket is comprised of loosely gathered elongated fibers which may either be natural or synthetic. The fibers 11 are generally oriented in the longitudinal direction as shown and are saturated or otherwise treated with a suitable uncured binder. In one preferred embodiment, the blankets 10 are formed of glass fibers 11 impregnated or otherwise coated with a phenolic resin.

Figure 1B:
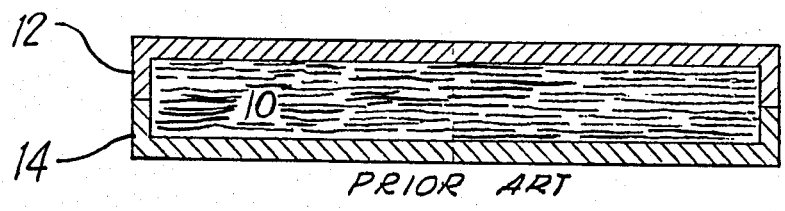

Let it be assumed that the blankets employed for producing a molded end product have a nominal thickness of one inch and a nominal density of one pound per cubic foot. Assuming that it is desired to produce a molded member having a density of eight pounds per cubic foot and a thickness of one half inch the desired molded end product may be formed of four such blankets 10-1 through 10-4 which are compressed within a mold shown, for example, in FIG. 1(b) as being comprised of mold halves 12 and 14. The four uncompressed blankets 10-1 through 10-4 are arranged upon the lower mold half 14. The upper mold half 12 is enclosed upon the lower mold half 14, compressing the blankets 10 to a thickness of one half inch, for the example given. This results in a density of eight pounds per cubic foot. The mold halves are heated by suitable heating means (not shown for purposes of simplicity) in order to cure the binder throughout the entire thickness of the molded member and thereby set the fibers. The blankets undergo substantially equal compression so that the molded end product has a substantially uniform density across the thickness of the end product. It should be noted that the mold halves 12 and 14 in FIG. 1(b) show an arrangement for molding flat panels. However, it should be understood that the mold halves 12 and 14 may be contoured in any desirable fashion to produce molded products having curved shapes and varying thicknesses and/or contours.

Figure 1C:
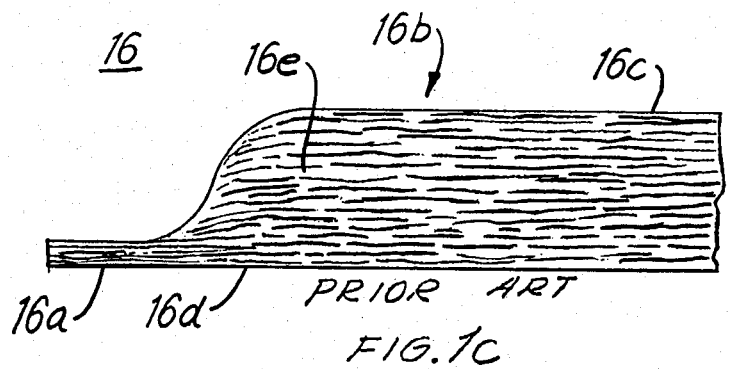

One of the problems encountered in the molding of such products can be best understood from a configuration of FIG. 1(c) which shows a portion of a molded end product having a region of significantly reduced thickness. Assuming that the major portion of molded end product of FIG. 1(c) has a thickness of the order of one inch and a density of the order of eight pounds per cubic foot, a sufficient number of blankets 10-1, 10-2, etc. of loosely gathered fibers of the type shown by the blanket arrangement 10 in FIG. 1(a) may be utilized to produce the end product 16 of FIG. 1(c) having the desired thickness. A portion 16(a) of end product 16 which is designed to cooperate with a fastening member (not shown) for securing molded member 16 to a mounting surface (not shown) is compressed so that the blankets forming the end product are compressed by a very significant amount. In the example given, the reduced thickness may be of the order of 0.125". Thus, the density of the molded end product in the region 16(a) is of the order of 64 lbs. per cubic foot. The fibers employed in the blankets of loosely gathered fibers may be incapable of being compressed to the required extent, necessitating a reduction in the nominal density of the blankets originally employed, thereby leading to a reduction in the density of the molded member 16 in the region 16(b) which is a necessary compromise in order to be assured that the blankets can be compressed to an amount sufficient to obtain the desired thickness in the region of section 16(a) of the molded member 16. As a result of this compromise, the acoustical attenuation characteristic as well as other desired physical properties are reduced to a value below the originally desired level.

The time required to set the binder within the fibrous blanket must be of a length sufficient to ensure that the binder in the intermediate portion of the molded member has adequately set, thus requiring more time than would be required to set the binder in the immediate region of the major surfaces 16(c) and 16(d) of the molded member. The molded member resulting from this process typically loses some of its resilience and becomes fairly brittle and is susceptible to cracking and breakage if it is bent during handling and/or storage.

Turning now to a consideration of the present invention, FIGS. 2(a) through 2(e) depict the developmental stages of a novel method and apparatus for producing a molded end product having vastly improved thermal and/or acoustical properties and structural characteristics as compared with those molded end products produced in accordance with the method described hereinabove in connection with FIGS. 1(a) through 1(c).

Figure 2A:
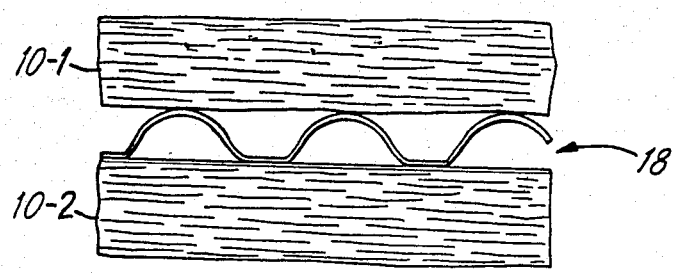
Figure 2B:
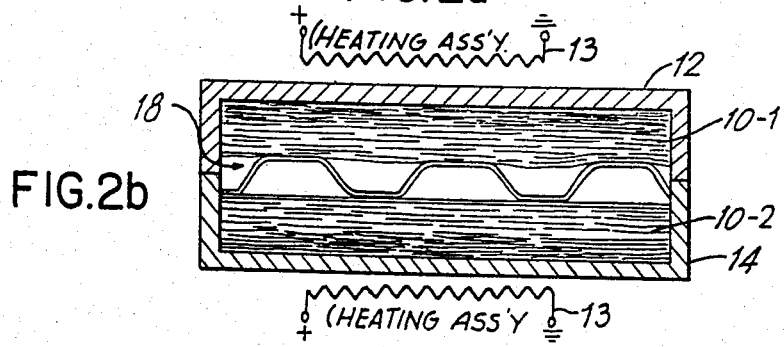
Figure 2C:
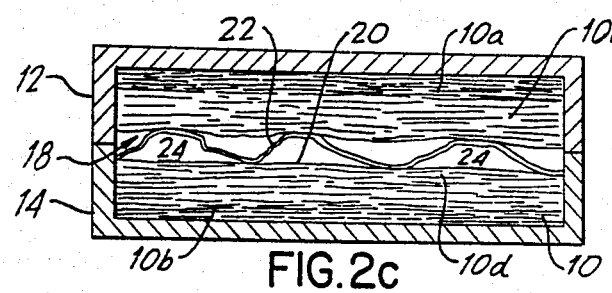

In the arrangement 101 of the present invention, a plurality of blankets 10-1 and 10-2 substantially of the type shown and described in connection with FIG. 1(a) are arranged in a stack with an interposed media 18 being positioned therebetween, see FIG. 2a. The characteristics of the interposed media are such that it is relatively incompressible under moderate compressive forces, as compared with the blankets 10-1 and 10-2 of loosely gathered fibers so as to undergo significantly less compression than said blankets 10-1 and 10-2 when pressed together by said moderate compressive forces. The interposed media 18 may take the form of the preferred embodiment shown in FIG. 3 which is comprised of first and second sheets 20 and 22 of a thin gauge plastic film. The sheets 20 and 22 of plastic film are fused or otherwise joined together in such a way as to define a plurality of individual pockets or chambers 24, each filled with air or any other suitable, preferably non-toxic and non-volatile gas. The air-filled compartments or chambers 24 are collectively capable of withstanding rupturing under the application of moderate pressure exerted by the mold halves 12, 14, although the chambers 24 do yield somewhat. However, comparatively speaking, the interposed media 18 undergoes an insignificant amount of compression as compared with the contraction experienced by the blankets 10, when compressed by moderate compressive forces within a mold. FIG. 2(a) shows the interposed media 18 and blankets 10-1 and 10-2 substantially uncompressed. In FIG. 2(b) the layered arrangement of blankets 10-1 and 10-2 and the interposed media 18 are placed upon lower mold half 14. Upper mold half 12 is urged downwardly toward lower mold half 14, compressing the blankets 10-1, 10-2 by a significant amount, whereas interposed media 18 experiences only a small amount of contraction in comparison to blankets 10-1 and 10-2 due to the relatively moderate compressive forces exerted thereon by the mold halves 12 and 14 which forces tend to flatten the otherwise rounded upper ends of the air encapsulated chambers 24.

As was mentioned hereinabove, the mold halves 12, 14 are heated by suitable heating means 13, 13 to cure the binder provided in each blanket 10-1, 10-2. The sheets of thin gauge plastic film 20 and 22 are preferably formed of a plastic material which begins to soften at temperatures in the range of 200°–220° F. and which melt at the order of 300° F., the latter temperature being below that necessary to cure the aforementioned binder contained in blankets 10-1, 10-2. Phenolic resins, for example, cure at temperatures up to 500° F. A temperature gradient is developed across the thickness of the layers 10-1, 10-2 and media 18, the uppermost surface of upper layer 10-1 and the lowermost surface of lower layer 10-2 being at a relatively high temperature and the temperature profile across said layers reducing gradually from both the upper and lower surfaces engaging mold halves 12 and 14 toward the intermediate portion thereof. As a result, the binder in the upper portion 10(a) of upper blanket 10-1 and the lower portion 10(b) of lower blanket 10-2 begins to cure. At the same time, the plastic film 20 and 22 begins to soften since the temperature in the intermediate region is sufficient to soften the plastic film 20, 22 allowing the air captured within the chambers 24 to escape. As the plastic film 20, 22 softens and begins to melt, the initial substantial incompressibility of the interposed media 18 rapidly diminishes by a significant amount. Since the binder in the lower region of 10(c) of upper blanket 10-1 and the binder in the upper region 10(d) of lower blanket 10-2 has not yet been cured, the compressed fibers have not yet set, and are free to expand toward their normally uncompressed state to fill the void being created by the contracting interposed media 18.

Figure 2D:
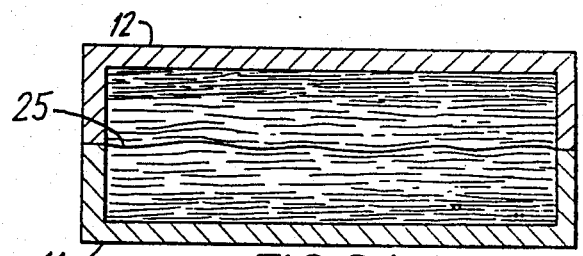

The temperature profile in the region occupied by interposed media 18 preferably eventually increases to a level beyond the melting point of the plastic film 20, 22 causing both sheets 20, 22 of film to rapidly melt whereupon all of the encapsulated air is free to escape from the chambers 24, as well as the highly porous blankets 10-1 and 10-2. Thus, it can be seen that the interposed media 18 contracts from a partially collapsed state shown in FIG. 2(c) to a substantially fully collapsed state shown in FIG. 2(d), wavy line 25 substantially representing the remnants of interposed media 18. Since the binder in the regions 10(c) and 10(d) of the upper and lower blankets 10 has yet to cure, the fibers in this region which are still under compression, are free to expand into the region previously occupied by the interposed media 18 so as to substantially completely fill the void created by media 18 as shown in FIG. 2(d). As was mentioned hereinabove, the temperature profile across the thickness of the product being molded is higher in the regions close to the upper and lower surfaces of the blankets 10-1 and 10-2 engaging mold halves 12 and 14 wherein the binder is already cured. However, the binder in the intermediate region of the end product being molded has yet to cure.

Figure 2E:
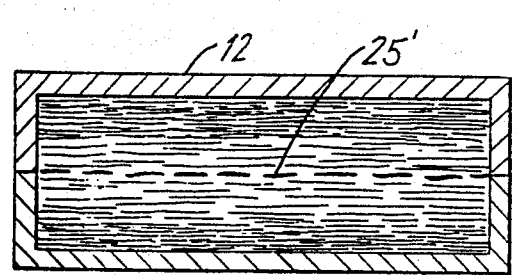

The thin gauge plastic film sheets 20 and 22 substantially represented by the wavy line 25 in FIGS. 2d, are completely melted and begin to disperse into the interstices of the fibrous composite of blankets 10-1, 10-2, leaving at most the remnants of an otherwise continuous sheet which is now provided with a plurality of discontinuities and, which is represented in FIG. 2(e) as a broken line 25', thereby contributing to the sound attenuation characteristic of the end product which is highly porous across the entire thickness thereof.

The molded end product is removed from mold halves 12 and 14 when the binder in the intermediate portion of the end product is fully cured. The resultant end product thus has a density which varies across the thickness thereof. The maximum density of the end product is found at the upper and lower major surfaces thereof and the density gradually decreases from both upper and lower major surfaces toward the intermediate portion of the end product as is shown in FIG. 2(e). The curing time to produce the panels of the present invention is one-half or less the curing time required to produce panels in accordance with the conventional method described in connection with FIGS. 1(a) through 1(c).

Figure 2F:
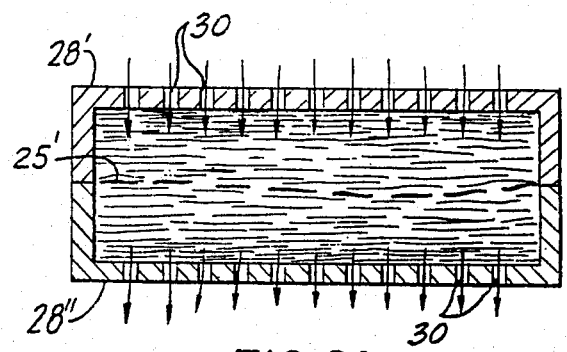

As was described hereinabove, the temperature within the mold comprised of members 12 and 14 is raised sufficiently to substantially fully melt the plastic film sheets 20 and 22 so that the melted material is free to be dispersed amongst the fibrous material. However, in order to more positively assure that the melted plastic film sheets 20 and 22 are adequately dispersed through the fibrous material, heated air under pressure may be introduced into the mold. The mold halves 28' and 28" in the embodiment of FIG. 2(f) may be formed of perforated metal sheets 28 having a plurality of perforations 30 which may be varied as to diameter and center to center spacing. It is preferable that the perforations 30 be small and closely spaced in order to allow for uniform and maximum introduction of air into the mold. Thus, heated air under pressure is introduced, for example, through the upper mold piece 28' and is allowed to escape through the perforations in lower mold piece 28". The air under pressure passes through the fibrous contents so as to effectively disperse the melted plastic material represented by dotted line 25' throughout the interstices of the molded product.

Figure 4:
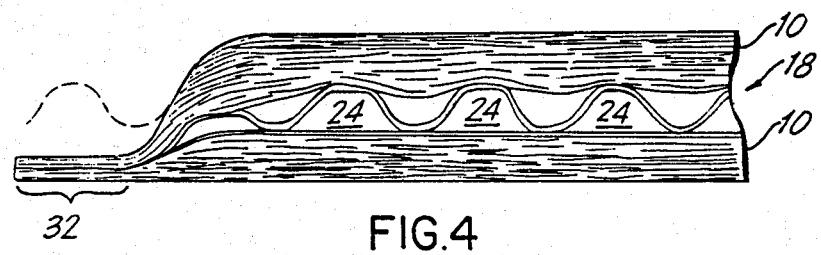
FIG. 4 shows an elevational detailed view of a portion of the end product being molded and which is useful in describing an advantageous characteristic thereof.

Although the interposed media 18 is substantially incompressible as compared with the blankets 10-1, 10-2 of loosely gathered fibers, the interposed media 18 will, nevertheless, rupture in the presence of relatively high magnitude compressive forces. For example, assuming that it is desired to produce a molded end product having the configuration shown in FIGS. 1(c) and 4, the mold halves 12, 14 although not shown in FIG. 4 for purposes of simplicity, are shaped to urge the blankets 10 of loosely gathered fibers and the interposed media 18 into the configuration as shown. The air chambers 24 in the region of maximum mold thickness undergo slight contraction due to the moderate compressive forces exerted upon the interpose media and primarily due to the fact that the blankets 10-1, 10-2 undergo a substantially large amount of compression whereby the compressive forces are primarily absorbed by the blankets 10-1, 10-2 of loosely gathered fibers. However, in the region of the reduced thickness flange portion 32, both the blankets 10-1, 10-2 and the interposed media 18 experience large compressive forces which forces are sufficient to rupture the air compartments 24 in the region of reduced thickness flange portion 32, so that the contribution of the thickness of the interposed media 18 to the overall thickness of the member to be molded in the region of flange portion 32 constitutes no more than the total thickness of the thin gauge film sheets 20 and 22 which contribution is rather insignificant. Thus it can be seen that the interposed media 18 contributes an insignificant amount of material to the molded end product in regions of significantly reduced thickness, thereby allowing wider latitude in the selection and establishment of design criteria for molded end products made through the employment of the novel method disclosed herein.

The interposed medium 18 may assume a variety of different shapes and configurations. For example, the interposed medium may consist of one large envelope 34 (FIG. 6a) which is provided with a short hollow tube 36 for introducing air into envelope 34. The tube 36 may then be sealed by heating and fusing the plastic material after air of the desired pressure is introduced into envelope 34. The interior air pressure may be regulated to obtain the desired compression of the blankets of loosely gathered fibers to further regulate the amount of compression experienced by the blankets. The embodiment of FIG. 6(a) is preferable for use in the molding of substantially flat panels. Alternatively, the interposed medium 18 of FIG. 3 may be made in varying thickness, i.e. may have air pockets 24 of varying volumes. Also two or more interposed media 18 may be stacked, one upon the other, to obtain a desired final thickness.

In the embodiment shown in FIG. 6(b), the interposed media is comprised of a plurality of individual envelopes 34' and 34" each of which is provided with a short hollow tube 36', 36" respectively, for independently regulating the air pressure which design is extremely advantageous for use in producing molded members of varying thickness. Obviously, the number of individual envelopes 36 may be greater than two in number and the envelopes may also vary in both size and their distribution about the interposed media.

Alternatively, variations of the embodiment of FIG. 3 may be utilized, each varying in normal uncompressed thickness to provide still further flexibility in the selection of density of the end product, thus enabling the design of a molded end product having design criteria with fewer compromises than are required in molded products having the desired thermal and/or acoustic properties and which are formed through conventional techniques, such as those described in connection with FIGS. 1(a) through 1(c).

As was described hereinabove, the filler employed is not limited to the interposed media 18 of FIG. 3, for example. Any other filler may be employed which has the characteristics of being substantially less yieldable than the fibrous blankets described above and which is adapted to soften and melt during the heating phase to be dispersed through the interstices of the blanket enabling the fibrous blankets to expand into the void created by the contracting filler. Suitable materials having these characteristics include thermosetting plastic materials such as, but not limited to, expanded polystyrene, and other thermoplastic materials exhibiting similar characteristics.

FIG. 7 shows an arrangement wherein the interposed media 18' comprises a plurality of beads 40 of expanded polystyrene which are deposited upon the top surface of lower blanket 10. The binder typically has adhesive properties and serves to retain the beads in position. The amount of beads placed in the mold is a function of the desired density profile. The beads of expanded polystyrene have relatively low density and are substantially less yieldable than the fibrous blankets 10,10. Thus, when the mold halves 12 and 14 are closed upon members 10, 10 and 18' the blankets 10,10 undergo a significant amount of compression while the beads 18' undergo only a slight amount of compression due to the moderate compressive forces exerted by the mold members 12, 14 upon the members 10, 10, 18'.

The temperature profile created across the mold acts upon member 10, 10 and 18' in a manner similar to that described in connection with the embodiment of FIGS. 2a-2e, wherein the binder begins to set in the regions adjacent to the mold interior surface; the interior region, however, is not hot enough to cause the binder to be cured and set but is hot enough to soften and melt the beads 40 which rapidly collapse, enabling the blankets 10, 10 to expand and fill in the void created by the melting beads. The melting material, in the fluid state, disperses throughout the interstices of the fibrous material of blankets 10, 10, yielding a molded end product having maximum density along its opposite major faces and having minimum density in the interior region. The filler material may also add some additional supporting strength to the finished panel. If desired, air under pressure may be introduced into the mold to enhance the dispersion of the filler material 18' into the interstices of the fibrous material.

If desired, the filler 18" shown in FIG. 8 may be a solid unitary member 42 such as a panel molded of expanded polystyrene or material exhibiting similar characteristics. The panel 42 is similarly of a material of low density. However, the panel is significantly less yieldable than the highly compressible blankets and is adapted to soften and melt at a temperature well below the curing and setting temperature of the binder provided in blankets 10, 10. The dispersion of the filler panel 42 into the interstices of the fibrous material may be enhanced by introducing air under pressure into the mold interior, as was described hereinabove.

The filler panel 42 may be of uniform thickness or may have portions of reduced and/or increased thickness to accommodate particular contours and shapes of the molded end product. The panels are preferably prepared prior to the molding process.

Molded end products produced through the method and apparatus of the present invention have been found to provide thermal and/or acoustic properties equivalent to and in most cases better than molded products produced through conventional techniques, and which further require less raw material than the end products formed in accordance with conventional techniques. In addition, the density variation across the molded product of the present invention yields a product which is much more resilient than molded members made in the conventional manner in that they are quite flexible and can bend and recover to their original shape without breaking. The molding time required for the method of the present invention has also been found to be less than half of that required when molding members in the conventional technique. The method for molding members in accordance with the present invention may be used to mold sheets or panels of uniform thickness or varying thickness and may further be used to mold members having both varying thickness and complex shapes and contours. For example, the present invention has been used to great advantage in the molding of headliners to be employed for providing thermal and/or acoustical attenuation within the cabins of large commercial and industrial vehicles such as trucks, earthmoving machinery, farm machinery and the like.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein. For example, two or more interposed media 18 may be employed in a mold with one or more blankets of the type show as blanket 10-1 being positioned between the plural interposed media 18. Alternatively, a greater number of blankets may be positioned to one surface of the interposed media and a lesser number of blankets may be positioned to the opposite surface of the interposed media.

What is claimed is:

1. A one-piece member for use as an acoustical and/or thermal barrier, a major portion of said member having a substantially uniform thickness measured across the major surfaces thereof;

said member being comprised of fibers set in a binder;

the density of said member varying across the thickness thereof whereby the density of said member gradually decreases from the major surfaces toward the intermediate portion thereof.

2. The member of claim 1 wherein said fibers extend generally in the same direction.

3. The member of claim 1 wherein said fibers are selected from a group consisting of natural and synthetic fibers.

4. The member of claim 1 wherein said binder is a thermosetting binder.

5. The member of claim 1 wherein said binder is a thermoplastic binder.

6. The member of claim 1 wherein said binder is a phenolic resin.

7. The member of claim 1 wherein said member is molded into a non-planar shape conforming to the contours of the supporting surface to which it is mounted.

* * * * *